(12) United States Patent
Karnati et al.

(10) Patent No.: US 12,129,769 B2
(45) Date of Patent: Oct. 29, 2024

(54) EROSION-SHIELDED TURBINE BLADES AND METHODS OF MANUFACTURING THE SAME

(71) Applicant: GE Infrastructure Technology LLC, Greenville, SC (US)

(72) Inventors: Sreekar Karnati, Guilderland, NY (US); Yang Jiao, Schenectady, NY (US); Changjie Sun, Clifton Park, NY (US); John Matthew Sassatelli, Valley Falls, NY (US); Anthony Poli, Niskayuna, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/973,085

(22) Filed: Oct. 25, 2022

(65) Prior Publication Data

US 2024/0133299 A1 Apr. 25, 2024
US 2024/0229653 A9 Jul. 11, 2024

(51) Int. Cl.
*F01D 5/28* (2006.01)
*F03D 1/06* (2006.01)

(52) U.S. Cl.
CPC ............ *F01D 5/286* (2013.01); *F03D 1/0675* (2013.01)

(58) Field of Classification Search
CPC .............................. F01D 5/286; F03D 1/0675
See application file for complete search history.

(56) References Cited

U.S. PATENT DOCUMENTS

| 4,842,663 A | 6/1989 | Kramer |
| 9,291,062 B2 | 3/2016 | Jones et al. |

(Continued)

FOREIGN PATENT DOCUMENTS

| EP | 2781622 A1 | 9/2014 |
| FR | 3102378 A1 | 4/2021 |

(Continued)

OTHER PUBLICATIONS

Lupoi, Rocco et al., "Hardfacing steel with nanostructured coatings of Stellite-6 by supersonic laser deposition" Light: Science & Applications 2012; e10; doi: 10.1038/lsa.2012.10; 6 pp.

(Continued)

*Primary Examiner* — Jacob M Amick
*Assistant Examiner* — Charles J Brauch
(74) *Attorney, Agent, or Firm* — Armstrong Teasdale LLP

(57) ABSTRACT

A method of forming an erosion shield for a turbine blade includes depositing a layer of filler material defining an upper surface. The method also includes depositing a layer of erosion-resistant material across the upper surface of the layer of filler material. An interface is defined between the layer of filler material and the layer of erosion-resistant material and has a shape of the upper surface. The method also includes machining the layer of filler material to produce the erosion shield. The erosion shield has the layer of erosion-resistant material, the machined layer of filler material, and the interface defined therebetween. An inner surface of the erosion shield is defined by the machined layer of filler material that is sized and shaped for attaching to a leading edge of the turbine blade. Each of the interface and the inner surface extend a length of the erosion shield.

20 Claims, 5 Drawing Sheets

(56) References Cited

U.S. PATENT DOCUMENTS

| | | |
|---|---|---|
| 9,695,697 B2 | 7/2017 | Fandrei, II |
| 9,776,282 B2 | 10/2017 | Subramanian et al. |
| 10,907,483 B2 | 2/2021 | Okuda et al. |
| 11,135,677 B2 | 10/2021 | Mangano et al. |
| 2010/0322775 A1 | 12/2010 | Suerken |
| 2013/0101425 A1 | 4/2013 | Arai et al. |
| 2013/0259698 A1 | 10/2013 | Jones et al. |
| 2016/0208624 A1 | 7/2016 | Smith |
| 2018/0045216 A1* | 2/2018 | Karlen .................. F04D 29/023 |
| 2018/0304418 A1 | 10/2018 | Wiebe et al. |
| 2019/0136697 A1 | 5/2019 | Foster |
| 2020/0116044 A1 | 4/2020 | Jain et al. |
| 2020/0232333 A1* | 7/2020 | Shuck ..................... F01D 5/288 |
| 2022/0143922 A1 | 5/2022 | Barua |
| 2022/0203448 A1 | 6/2022 | Kulkarni et al. |
| 2022/0362856 A1 | 11/2022 | Suchel et al. |

FOREIGN PATENT DOCUMENTS

| | | |
|---|---|---|
| JP | S58145376 A | 8/1983 |
| KR | 20040100506 A | 12/2004 |
| TW | 253473 B | 4/2006 |

OTHER PUBLICATIONS

Xu, Guojian et al., Cladding of Stellite-6 and Vanadium Carbide on Carbon Steel Using a Yttrium-Aluminum-Garnet Laser Robot system; Journal of Laser applications 18, 47 (2006); https://doi.org/10.2351/1.1961689; Published Online Mar. 9, 2006.

* cited by examiner

EROSION-SHIELDED TURBINE BLADES AND METHODS OF MANUFACTURING THE SAME

FEDERAL RESEARCH STATEMENT

The subject matter of this disclosure was made with Government support under Contract No. DE-FE0031807, awarded by the Department of Energy (DOE), and the Government has certain rights in the subject matter claimed herein.

BACKGROUND

The field of the disclosure relates generally to rotary machines, and more particularly to blades used with rotary machines including an erosion-shielded leading edge.

At least some known rotary machines include at least one rotor assembly coupled to a rotor shaft. The rotor assembly includes a plurality of circumferentially-spaced blades that extend radially outward towards a stationary casing that defines a portion of a flow path through the rotary machine. A plurality of stationary vanes (or nozzles) are coupled to the casing in a circumferential array such that the stationary vanes extend radially inwardly into the flow path. The stationary vanes and rotating blades are arranged in alternating rows such that a row of vanes and the immediate downstream row of blades form a "stage" of the rotary machine. The vanes direct the flow towards the downstream row of blades wherein the blades extract energy from the flow, thereby developing the power necessary to drive a rotor and/or an attached load, e.g., a generator. For example, but not by way of limitation, the rotor assembly may be part of a steam turbine, or part of a compressor or turbine section of a gas turbine engine.

At least some known steam turbines extract work from a flow of steam to generate power by converting the energy of high-temperature, high-pressure steam generated by a boiler into rotational energy by channeling the steam through various stages of the stationary vanes and rotating blades. Generally, a steam turbine may include a high pressure section, an intermediate pressure section, and a low pressure section. The sections may be arranged in a serial-flow orientation wherein each section includes any number of stages that each include a row of vanes and a downstream row of blades. Each turbine stage is designed to extract useful work from the steam channeled through the flow path. Steam flowing through the flow path causes the blades to rotatably drive the rotor, thereby extracting work from the steam. The steam gradually expands and the temperature and pressure of the steam may gradually decrease. Between the various turbine sections, the steam may be reheated for performing work in the next section prior to the steam being exhausted from the turbine exhaust. Higher temperature steam turbines may generate increased output as the increased temperature of the steam increases the overall energy available for extraction.

As the pressure and temperature change, the steam may become wet and moisture contained in the steam may condense into fine water droplets on turbine surfaces, including the nozzles. Moisture contained in the steam is mainly deposited on concave surfaces of the nozzles in the form of films of water. The water films extend across the surface of the nozzles and flow towards the trailing edge of each nozzle while increasing in thickness. The water films are released from the trailing edges of the nozzles as water droplets. If the water films are thick, large and coarse water droplets are released. The coarse water droplets are scattered by the steam flow and collide with the blades downstream of the nozzles. The collisions damp the torque of the blades through high speed impacts and thus decrease the total performance of the turbine. The coarse water droplets may also cause erosion of surfaces of the blades, which decreases the aerodynamic performance and section thickness of the blades and thus shortens their useful lifespan.

In a steam turbine, late stage moisture in the form of water droplets may create significant erosion in late stage turbine blades. Generally, as the size of the water droplets increases, the amount of erosion caused by the water droplets increases. Late stage blades include a leading edge that forms an impact region of the blade with the flow path during operation. An operational life cycle of such blades may be limited at least in part by damage or deterioration to the blade at the leading edge resulting from the mechanical and/or thermal stresses induced during turbine operation.

To facilitate reducing the effects of such stresses, at least some blades may include a shield extending across a leading edge of the blade. The shield may be formed from an erosion-resistant material, such as a cobalt-chromium alloy (such as those marketed under the trademark Stellite® by Kennametal Inc., Latrobe, Pa.), that is used as an erosion shield in late stage blades. Conventionally, the blade is retrofitted with the erosion shield through a multi-stage process which undesirably adds complexity to forming and/or repairing the blades. For example, the blade including an erosion-shielded leading edge may be formed by first sectioning a blade tip portion of the blade from an airfoil portion extending between the blade tip portion and a dovetail, and welding a single billet of the erosion-resistant material to each sectioned portion held in place. The sectioned portions are subsequently welded back together. Finally, an erosion-resistant overlay portion is welded to a nose of the single billet of material and the blade tip portion. Such processes are disadvantageous as they increase manufacturing and repair times, downtime costs, and other operational inefficiencies. Additionally, conventional erosion shields that are welded to the blade as a single billet of material require additional machining of the billet to a suitable geometry. The additional machining of the erosion-resistant material introduces additional process complexities and requires a greater amount of erosion-resistant material to form the erosion shield from the billet, which increases costs and introduces material sourcing challenges. Accordingly, there is a need for blades having erosion-shielded leading edges, and methods of manufacturing blades having erosion-shielded leading edges, that address the above-described problems.

BRIEF DESCRIPTION

In one aspect, a method of forming an erosion shield for use with a turbine blade includes depositing a layer of filler material using a directed energy deposition (DED) system, the layer of filler material defining an upper surface; depositing a layer of erosion-resistant material across the upper surface of the layer of filler material using the DED system, an interface being defined between the layer of filler material and the layer of erosion-resistant material and having a shape of the upper surface; and machining the layer of filler material to produce the erosion shield extending a length between a base end and a nose, the erosion shield having the layer of erosion-resistant material, the machined layer of filler material, and the interface defined therebetween, an inner surface of the erosion shield being defined by the machined layer of filler material that is sized and shaped for attaching to a leading edge of the turbine blade, each of the interface and the inner surface extending the length of the erosion shield.

In another aspect, a method of forming an erosion-shielded turbine blade includes providing a turbine blade for use with a rotary machine, the turbine blade comprising an airfoil extending between a root and a tip of the turbine blade, the airfoil comprising a pressure side and an opposite suction side, each of the pressure and suction sides extending between a leading edge and a trailing edge. The method also includes forming an erosion shield by depositing a layer of filler material using a directed energy deposition (DED) system, the layer of filler material defining an upper surface; depositing a layer of erosion-resistant material across the upper surface of the layer of filler material using the DED system, an interface being defined between the layer of filler material and the layer of erosion-resistant material and having a shape of the upper surface; and machining the layer of filler material to produce the erosion shield extending a length between a base end and a nose, the erosion shield having the layer of erosion-resistant material, the machined layer of filler material, and the interface defined therebetween, an inner surface of the erosion shield being defined by the machined layer of filler material that is sized and shaped for attaching to the leading edge of the turbine blade, each of the interface and the inner surface extending the length of the erosion shield. The method also includes attaching the inner surface of the erosion shield to the leading edge of the turbine blade to thereby form the erosion-shielded turbine blade.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
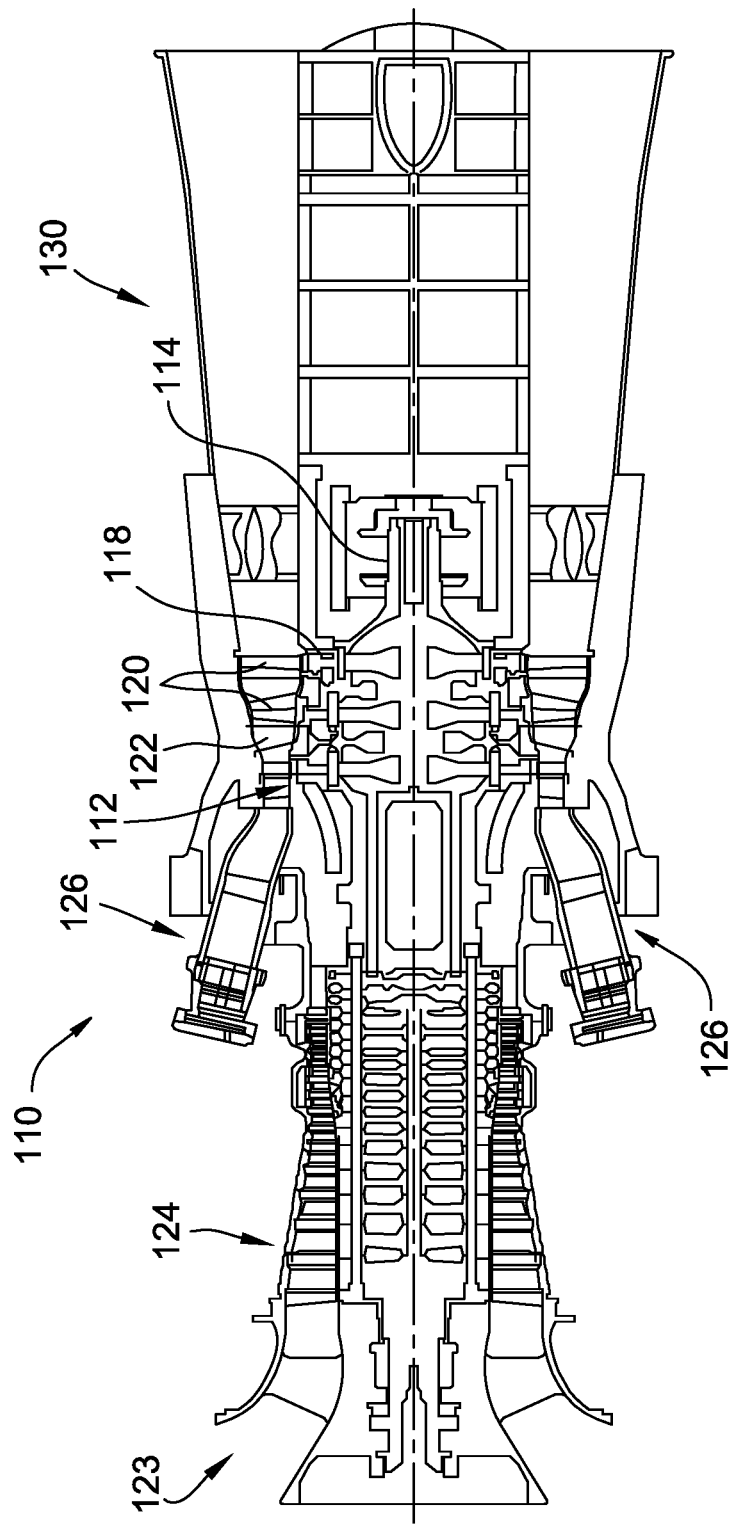
FIG. 1 is a schematic view of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein overcome at least some of the disadvantages of known erosion-shielded rotary components and known methods of manufacturing erosion-shielded rotary components. The embodiments include an erosion-shielded rotary component that includes a pre-formed erosion shield extending across a leading edge of the rotary component. In some embodiments, the rotary component is a blade used in a rotary machine, such as a steam turbine or a gas turbine, for example. The pre-formed erosion shield is formed by depositing sequential layers of additive material using a directed energy deposition (DED) system. Suitably, the pre-formed erosion shield may be formed by depositing a layer of filler material and depositing a layer of erosion-resistant material across the layer of filler material, where an interface between the layer of filler material and the layer of erosion-resistant material extends the length of the pre-formed erosion shield. Advantageously, the pre-formed erosion shield is "attached" to the leading edge of the rotary component in a single fabrication step (e.g., a single fabrication step wherein the outer surface defined by the layer of filler material is welded to the leading edge). The embodiments disclosed herein facilitate a fast and simple single-step fabrication process for extending the pre-formed erosion shields across a portion of the rotary components, and thus facilitate eliminating complexities associated with conventional multi-step joining processes. Accordingly, manufacturing and repair times, downtime costs, and other operational inefficiencies associated with forming erosion-shielded rotary components can be substantially reduced as compared to the fabrication of at least some known rotary components. Additionally, the additive manufacturing processes utilize DED systems that may facilitate producing a near-net shape of the layer of erosion-resistant material, and thereby facilitate reducing material waste, overall material costs, and material sourcing challenges.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to an downstream or exhaust end of the rotary machine.

As used herein, the phrase "near-net shape" refers to being of a geometry and size that requires little or no machining and processing to produce a final shape of a component. As used herein, the phrase "net" refers to being of a geometry and size requiring no machining and processing to produce a final shape of a component.

"X-axis," "Y-axis," and "Z-axis," as used herein refer to mutually perpendicular axes (i.e., each are orthogonal to one another) and are used to describe three-dimensional aspects or orientations. The descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

FIG. 1 is a schematic view of an exemplary rotary machine 110. In the exemplary embodiment, rotary machine 110 is a gas turbine engine. Alternatively, rotary machine 110 may be any other turbine engine and/or rotary machine, including, without limitation, a steam turbine engine, a gas turbofan aircraft engine, other aircraft engine, a wind turbine, a compressor, and/or a pump. In the exemplary embodiment, gas turbine 110 includes a rotor assembly 112 that includes a shaft 114 and a plurality of axially-spaced rotor wheels 118.

A plurality of rotating blades or blades 120 are coupled to each rotor wheel 118 such that each blade 120 extends radially outward from each respective rotor wheel 118. More specifically, blades 120 are arranged in rows that extend circumferentially about each wheel 118. A plurality of stationary vanes 122 extend circumferentially around shaft 114 such that each row of stationary vanes 122 is between a pair of axially-adjacent rows of blades 120. For example, turbine 110 includes a plurality of stages that include a row of stationary vanes 122 and a row of rotating blades 120 extending from rotor wheel 118.

A compressor 124 is coupled downstream from an intake section 123, and a plurality of combustors 126 are coupled circumferentially about rotor assembly 112 such that each combustor 126 is in flow communication with compressor 124. An exhaust section 130 is coupled downstream from turbine 110. Turbine 110 is rotatably coupled to compressor 124 via shaft 114.

During operation, air at atmospheric pressure is compressed by compressor 124 and is delivered downstream to combustors 126. The air exiting the compressor is heated by adding fuel to the air and burning the resulting air/fuel mixture. The gas flow resulting from combustion of fuel in the combustion stage then expands through the turbine 110, delivering some of its energy to drive the turbine 110 and a load, such as an electrical generator.

To produce the required driving torque, turbine 110 consists of one or more stages. Each stage includes a row of the stationary vanes 122 and a row of the rotating blades 120 mounted on the rotor wheel 118. The stationary vanes 122 direct the incoming gas from the combustion stage onto the rotating blades 120 to thereby drive the rotor wheel(s) 118, and rotor shaft 114.

Figure 2:
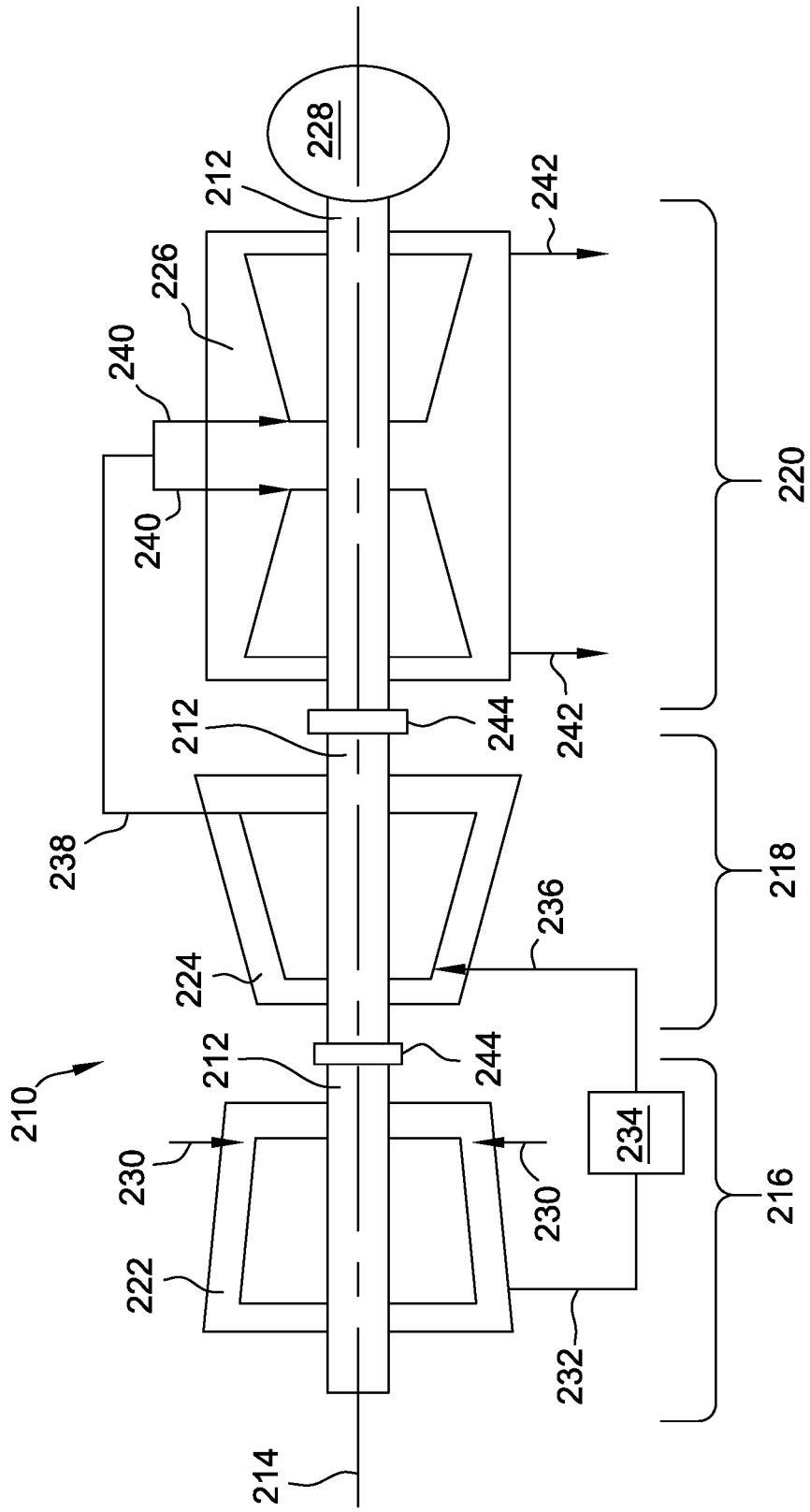
FIG. 2 is a schematic view of another exemplary rotary machine.

FIG. 2 is a schematic view of another exemplary rotary machine 210. In the exemplary embodiment, rotary machine 210 is a steam turbine engine. The steam turbine engine 210 includes a turbine rotor 212 that is mounted rotatably about an axis of rotation 214. The steam turbine engine 210 includes a high pressure (HP) section 216, an intermediate pressure (IP) section 218, and a low pressure (LP) section 220, each mounted on the rotor 212. While FIG. 2 shows one exemplary arrangement of the HP section 216, the IP section 218, and the LP section 220, any suitable arrangement of the HP section 216, the IP section 218, and/or the LP section 220 may be utilized. Each of the HP section 216, the IP section 218, and the LP section 220 includes blades or blades (e.g., blade 300 shown in FIG. 3) that are circumferentially mounted on the rotor 212 in HP, IP, and LP casings 222, 224, 226 in each of the HP section 216, the IP section 218, and the LP section 220, respectively. The blades are driven by steam fed to the respective section, wherein the rotation of the blades resulting from the steam generates mechanical work. The mechanical work produced in the turbine 210 drives an external load 228, such as an electrical generator, via the rotor 212.

As shown in FIG. 2, high pressure steam is supplied via high pressure steam inlets 230. The steam is exhausted from the HP section 216 at a high pressure steam outlet 232 and fed to a reheater 234, in which heat is added to the steam. From the reheater 234, the steam is channeled to the IP section 218 via an intermediate pressure steam inlet 236. The steam is exhausted from the IP section 218 at an intermediate pressure steam outlet 238 and routed to the LP section 220 via a low pressure steam inlet 240. The steam is then exhausted from the LP section 220 via low pressure outlets 242.

Each of the HP section 216, the IP section 218, and the LP section 220 are connected along the rotor 212 via couplings 244. The couplings 244 may be mechanical couplings, such as bolted joints, or may be welded joints. In one embodiment, the couplings 244 enable selective detachment of any of the HP section 216, the IP section 218, and/or the LP section 220 for reconfiguration, service, or maintenance.

Figure 3:
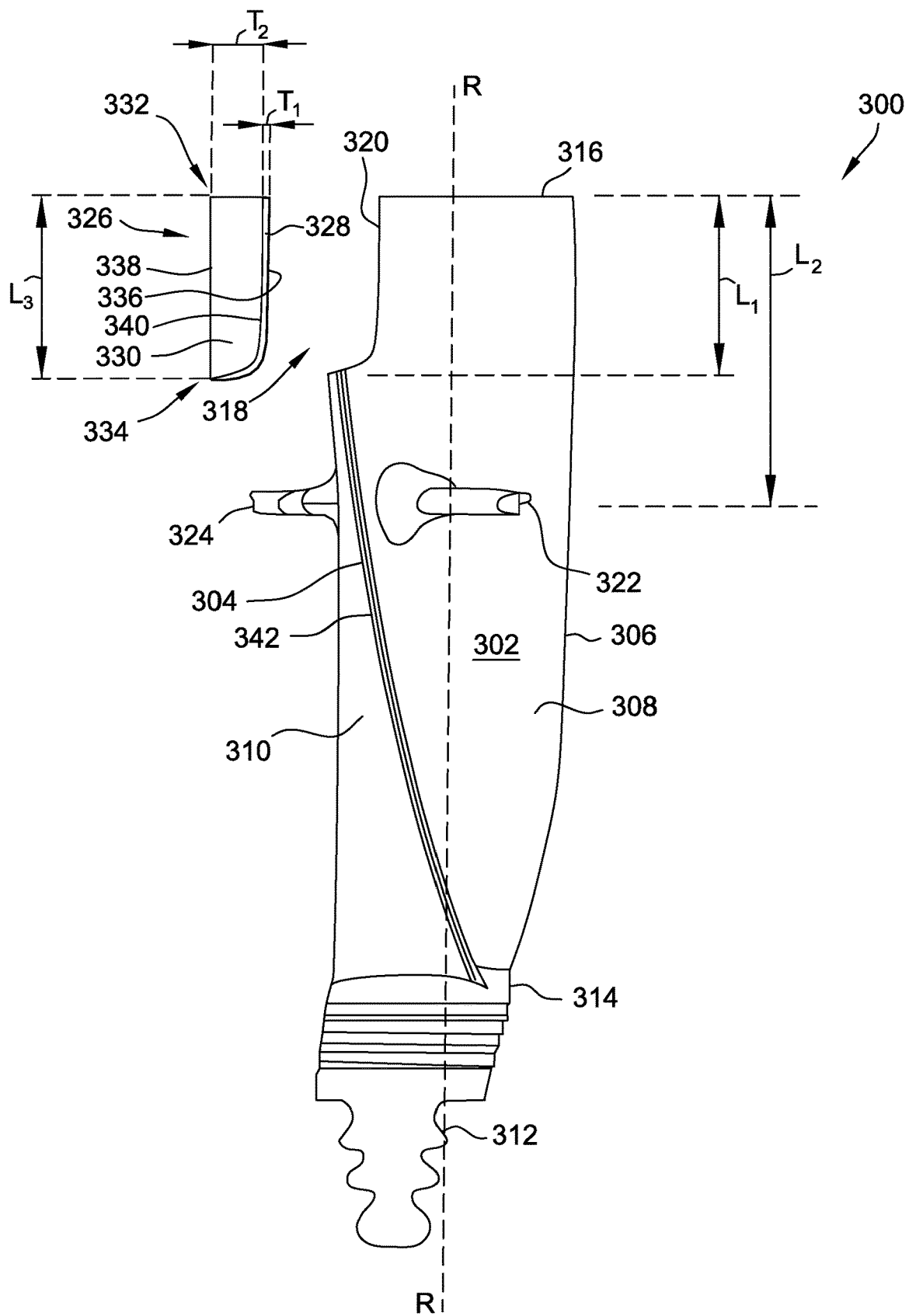
FIG. 3 is a front view of an exemplary blade that may be used with either of the rotary machines shown in FIGS. 1 and 2.

FIG. 3 is a front view of an exemplary blade 300 that may be used with rotary machine 110 (shown in FIG. 1) and/or rotary machine 210 (shown in FIG. 2). Additionally or alternatively, blade 300 may be used with other electric turbomachines including, but not limited to, gas turbofan aircraft engines, other aircraft engines, wind turbines, compressors, fans, and/or pumps. In the exemplary embodiment, blades 300 in each circumferential row at each stage of the rotary machine 110 and/or rotary machine 210 are identical. In alternative embodiments, at least one blade 300 in each row may be different from the remaining blades in that row.

Blade 300 includes an airfoil portion or airfoil 302 that includes a leading edge 304 and an opposite trailing edge 306. A pressure sidewall 308 and a suction sidewall 310 each extend from the leading edge 304 to the trailing edge 306. The blade 300 also includes a root 312 that enables the blade 300 to be installed in a rotary machine, for example, the rotary machine 110 (shown in FIG. 1) and/or the rotary machine 210 (shown in FIG. 2). The root 312, for example, enables the blade 300 to be coupled to the turbine rotor wheel 118 of the rotary machine 110. In the exemplary embodiment, the root 312 is in the form of a dovetail 312. The airfoil 302 and the root 312 are separated by a platform 314 which may include "angel-wing" seals (not shown).

The airfoil 302 extends between the platform 314 and a distal tip 316 along a radial axis R. The pressure sidewall 308 is a generally concave surface, relative to the radial axis R, and the suction sidewall 310 is a generally convex surface, relative to the radial axis R. As a result, the airfoil 302 has an arcuate contour about the radial axis R. A curvature of the pressure and suction sidewalls 308, 310 that defines the arcuate contour of the airfoil 302 may vary depending on the particular turbine and stage in which the airfoil 302 is intended for use. The present disclosure is not limited to any particular geometry of the airfoil 302, and the embodiments disclosed herein are suitable for use with airfoils 302 of various geometries. In particular, as shown in FIG. 3, the shape of the leading edge 304 depends on the arcuate contour of the airfoil 302, and the embodiments disclosed herein are suitable for use with and accommodate myriad variations of the shape of the leading edge 304.

In the exemplary embodiment, the airfoil 302 includes a recessed area 318 formed in the leading edge 304 near the tip 316. The leading edge 304 includes a recessed surface 320 that extends a radial length $L_1$ within the recessed area 318, measured along the radial axis R from the tip 316. The radial length $L_1$ of the recessed area 318 is generally shorter than a total radial length of the airfoil 302 measured along the radial axis R between the platform 314 and the tip 316. In the exemplary embodiment, the airfoil 302 also includes a pair of part-span shrouds 322 and 324 that facilitate tuning and/or damping vibrational characteristics of the airfoil 302 during operation. The part-span shrouds 322 extend outward in a mirrored relationship away from the airfoil 302. More specially, shroud 322 extends outwardly from the airfoil pressure sidewall 308 and shroud 324 extends outwardly from the airfoil suction sidewall 310. In the exemplary embodiment, the part-span shrouds 322 and 324 extend outwardly from the respective sidewall 308 and 310 at the same radial span, located a radial length $L_2$ from the tip 316 of the airfoil 302 along the radial axis R. The radial length $L_1$ is shorter than the radial length $L_2$, such that the shrouds 322 and 324 are each located radially inward from the recessed area 318.

Alternatively, the radial length $L_1$ may be longer than or equal to the radial length $L_2$. The part-span shrouds 322 and 324 of the blades 300 in each circumferential row at each stage of the rotary machine 110 and/or rotary machine 210 may be substantially circumferentially-aligned such that each of the shrouds 322 and 324 extends outwardly from the respective airfoil 302 at the same radial span location. Alternatively, the shrouds 322 and 324 may extend outwardly from the respective airfoil 302 at different radial span locations. The part-span shrouds 322 and 324 may have the same size and shape, each extending an equal axial distance from the respective sidewall 308 and 310 or, alternatively, the shrouds 322 and 324 may shaped and/or sized differently from each other.

Figure 4:
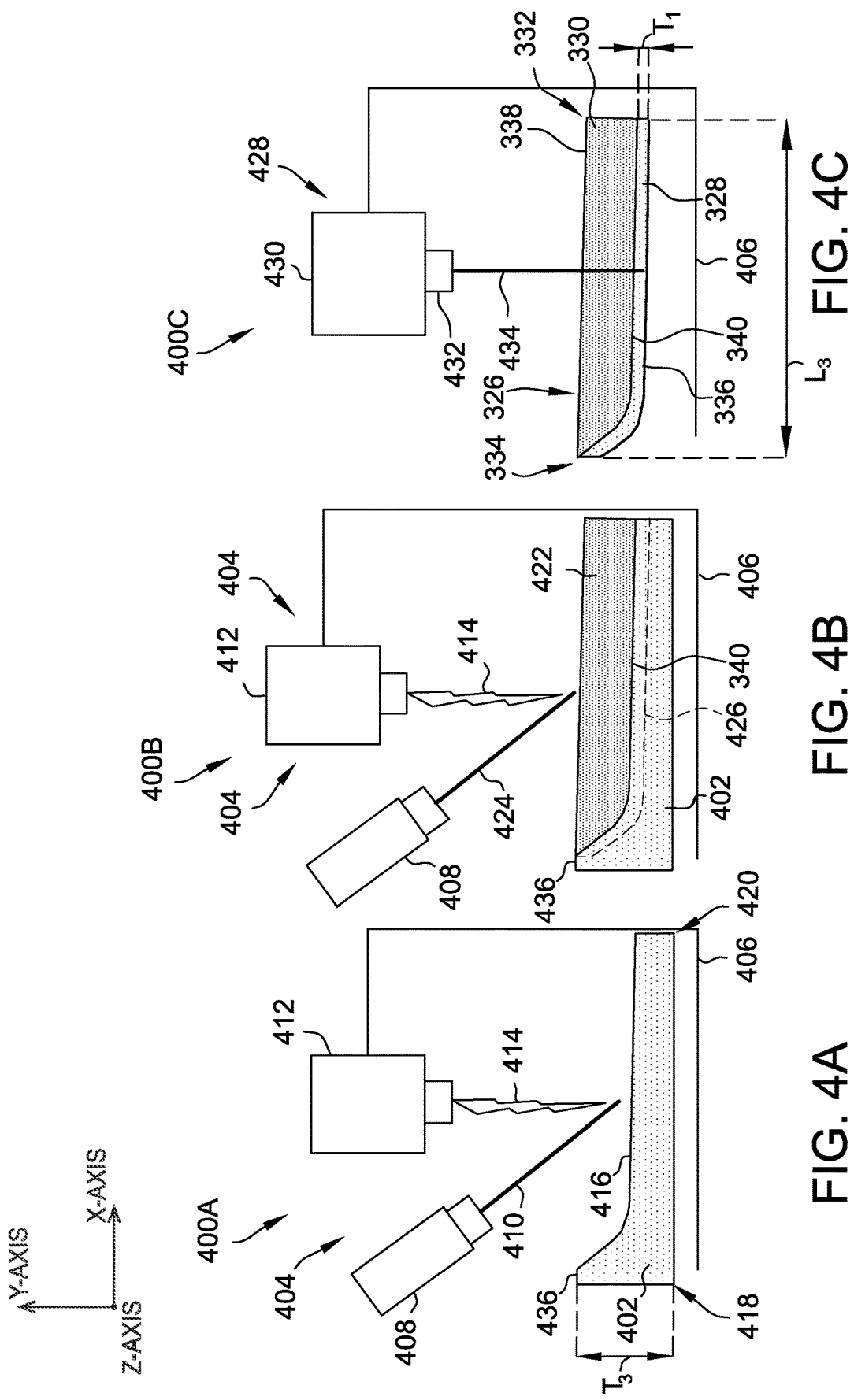
FIGS. 4A-4C show an exemplary process flow for forming an erosion shield of the blade shown in FIG. 3.

Each blade 300 also includes an erosion shield 326 extending across the leading edge 304 of the airfoil 302. The erosion shield 326 is formed of two or more material layers. More specifically, in the exemplary embodiment, the erosion shield 326 includes a first material layer 328 and a second material layer 330 deposited across the first material layer 328. The first material layer 328 is interposed between the second material layer 330 and the leading edge 304. Suitably, the erosion shield 326 is formed as a multi-material pre-form using deposited energy deposition techniques, described in more detail below with references to FIGS. 4A-4C.

In the exemplary embodiment, the erosion shield 326 extends a length $L_3$ between a base end 332 and a nose 334, and includes an inner surface 336 and an outer surface 338. The inner surface 336 is defined by the first material layer 328 and the outer surface 338 is defined by the second material layer 330. Moreover, the inner surface 336 extends across the leading edge 304 and secures the erosion shield 326 to the airfoil 302, and the outer surface 338 forms an externally-oriented surface of the airfoil 302. An interface 340 is defined as the transition between the first material layer 328 and the second material layer 330 deposited on the first material layer 328. The interface 340 may include a composition gradient between the adjacent first material layer 328 and the second material layer 330, described in more detail below. Suitably, in the exemplary embodiment, each of the interface 340 and the inner surface 336 extends the full length $L_3$ of the erosion shield 326 between the base end 332 and the nose 334, such that the interposed first material layer 328 extends substantially entirely between the airfoil 302 and the second material layer 328 when the erosion shield 326 is fully attached to the leading edge 304.

In the exemplary embodiment, the erosion shield 326 is received within the recessed area 318 of the leading edge 304 and the inner surface 336 is attached to the recessed surface 320. Moreover, the erosion shield 326 is sized and shaped to correspond to a size and shape of the recessed area 318. More specifically, the length $L_3$ of the erosion shield 326 between the base end 332 and the nose 334 is approximately equal to the radial length $L_1$ of the recessed area. The erosion shield 326 extends across the recessed surface 320 such that the base end 332 is adjacent to, and is substantially flush with, the tip 316 of the airfoil 302, and the nose 334 is adjacent to an intersection between the recessed surface 320 and a portion 342 of the leading edge 304 between the recessed area 318 and the platform 314. In some embodiments, the blade 300 may include a tip shroud (not shown) fixedly coupled to the tip 316 of the airfoil 302. The tip shroud is a member configured to contact a tip shroud of an adjacent turbine blade 300 to fix the turbine blade 300 or configured to suppress vibration of the turbine blade 300. The erosion shield 326 may extend the length $L_3$ beyond the tip 316 to substantially cover an outer portion of the tip shroud as well as the recessed area 318. Alternatively, a separate erosion-resistant component may be attached (e.g., welded) to the tip shroud and the base end 332 of the erosion shield 326. In embodiments where the blade 300 includes a tip shroud, fabricating the erosion shield 326 as a one-piece component that covers the recessed area 318 and the tip shroud may facilitate reducing the attachment (e.g., welding) process time compared to embodiments where a separate erosion-resistant component is used. The outer surface 338 defined by the second material layer 330 substantially matches or complements a contour of the portion 342 of the leading edge 304 such that a smooth transition is formed therebetween. It is contemplated that the outer surface 338 may include additional features to enable the erosion shield 326 to function as described herein. The inner surface 336 defined by the first material layer 328 is sized and shaped to substantially match or complement a three-dimensional geometry of the recessed surface 320.

As shown in FIG. 3, in the exemplary embodiment, the transition between the recessed surface 320 and the portion 342 of the leading edge 304 is such that the recessed surface 320 extends non-linearly relative to the radial axis R. As used herein, the phrase "non-linear" means deviating from a straight line at some point along the entire span. Accordingly, the inner surface 336 is shaped to extend non-linearly to correspond to the recessed surface 320. To ensure that the first material layer 328 extends substantially entirely between the second material layer 330 and the airfoil 302, the erosion shield 326 is formed such that the interface 340 is non-linear relative to the radial axis R when the erosion shield 326 extends across the recessed surface 320. Suitably, the non-linear interface 340 is shaped to substantially match or complement a shape of the inner surface 336 such that a thickness $T_1$ of the interposed first material layer 328 is substantially constant between the base end 332 and the nose 334.

The material used to form the first material layer 328 is a filler material that is selected to enhance attachment of the inner surface 336 defined by the first material layer 328 to the recessed surface 320. In some embodiments, the filler material is a material that enables the inner surface 336 to be welded to the recessed surface 320, such as, for example, via laser welding, gas metal arc welding (or metal inert gas welding), electron beam welding, or gas tungsten arc welding. In this regard, the pre-formed erosion shield 326 that includes the first material layer 328 may be secured to the leading edge 304 without the use additional material. The filler material is also suitably a material capable of withstanding thermal conditions to which it may be exposed within the turbine during operation. Suitable filler materials may include, for example, but are not limited to only including, nickel-based materials and iron-based materials. In one exemplary embodiment, the filler material is a nickel-chromium alloy material, such as, for example, an INCONEL® nickel-chromium superalloy material including INCONEL® Alloy 600, INCONEL® Alloy 617, and INCONEL® Alloy 625, available from Special Metals Corporation, Huntington, W. Va.

The first material layer 328, including the filler material, may have any suitable thickness $T_1$ that facilitates attachment of the inner surface 336 to the recessed surface 320 and that confers any additional desired properties. For example, in some embodiments, the thickness $T_1$ of the first material layer 328 is selected to provide a sufficient transition between the recessed surface 320 and the second material layer 330 when the inner surface 336 is attached to the recessed surface. In each embodiment, the first material layer 328 is selected to facilitate reducing or eliminating delamination, fatigue, welding difficulties, crack propagation, and/or other undesirable effects. For example, in some embodiments, the first material layer 328 has a thickness $T_1$ suitable to provide a barrier that facilitates limiting carbon migration between the airfoil 302 and higher carbon material that may be present in the second material layer 330, thereby reducing or eliminating weakening of a weld or heat affected zone. In various embodiments, the thickness $T_1$ depends on the process utilized to attach the inner surface 336 to the recessed surface 320. For example, where the inner surface 336 is welded to the recessed surface 320, the thickness $T_1$ may suitably be greater when using gas tungsten arc welding than the thickness $T_1$ when using electron beam welding. Depending on the application, a suitable thickness $T_1$ of the first material layer 328 may be between about 0.5 millimeters (mm) to about 200 mm, between about 1 mm to about 100 mm, between about 1 mm to about 50 mm, between about 1 mm to about 20 mm, and between about 1 mm to about 10 mm. In other embodiments, a suitable thickness $T_1$ of the first material layer 328 may be between about 50 mm to about 200 mm, between about 100 mm to about 150 mm, between about 100 mm to about 200 mm, between about 150 mm to about 200 mm, up to about 50 mm, up to about 100 mm, up to about 150 mm, up to about 200 mm. In still other embodiments, a suitable thickness $T_1$ of the first material layer 328 may be greater than about 0.5 mm, greater than about 1 mm, greater than about 5 mm, greater than about 10 mm, greater than about 15 mm, at about 1 mm, at about 1.5 mm, at about 5 mm, at about 10 mm, at about 15 mm, at about 20 mm, or any suitable combination, sub-combination, range, or sub-range thereof.

The material used to form the second material layer 330 is an erosion-resistant material selected to facilitate reducing or eliminating erosion of the leading edge 304 of the airfoil 302 across which the erosion shield 326 extends, for example, across the recessed surface 320. Suitably, the erosion shield 326 extends across the leading edge 304 such that the outer surface 338 forms an impact region during operation of a rotary machine. Suitable erosion-resistant materials include cobalt-based alloys, chromium-based alloys, tungsten-based alloy, chromium carbide materials, or combinations thereof. In some embodiments, the erosion-resistant material is a cobalt-chromium alloy, such as one of the STELLITE® family of cobalt-chromium alloys, including STELLITE® 6, available from Deloro Wear Solutions GmbH, Koblenz, Germany.

The second material layer 330, including the erosion-resistant material, has any suitable thickness $T_2$ to enable the erosion shield 326 to function as described herein. In one embodiment, the thickness $T_2$ of the second material layer 330 is selected to facilitate a sufficient wear resistance and/or erosion-resistance, for example, over a predetermined life of the blade 300. In various embodiments, depending on the application of the blade 300, a suitable thickness $T_2$ of the second material layer 330 is such that a sum total of the thickness $T_1$ of the first material layer 328 and the thickness $T_2$ is between about 5 mm to about 500 mm, between about 5 mm to about 100 mm, between about 10 mm to about 50 mm, between about 100 mm to about 500 mm, between about 200 mm to about 400 mm, between about 100 mm to about 200 mm, up to about 5 mm, up to about 10 mm, up to about 100 mm, up to about 500 mm, greater than about 5 mm, greater than about 10 mm, greater than about 100 mm, at about 5 mm, at about 10 mm, at about 100 mm, at about 500 mm, or any suitable combination, sub-combination, range, or sub-range thereof. Additionally, in some embodiments, due to the non-linear interface 340, the thickness $T_2$ of the second material layer 330 may vary along the length $L_3$ of the erosion shield 326. For example, as shown in FIG. 3, the thickness $T_2$ of the second material layer 330 tapers as the erosion shield 326 extends from the base end 332 towards the nose 334, such that the thickness $T_2$ of the second material layer 330 is thickest at the base end 332.

FIGS. 4A-4C show an exemplary process flow for forming the erosion shield 326. In the exemplary embodiment, the erosion shield 326 is formed as a multi-material pre-form that can be joined or attached (e.g., welded) in a single fabrication step to the leading edge 304 of the airfoil 302 (shown in FIG. 3). The erosion shield 326 is formed using directed energy deposition (DED) additive manufacturing techniques, which facilitate forming the erosion shield 326 with a desired size and shape that substantially matches or complements a geometry of the leading edge 304 across which the erosion shield 326 extends (e.g., recessed area 318). Moreover, such additive manufacturing techniques enable the formation of the erosion shield 326 having the non-linear interface 340 with suitable volumes (or thicknesses $T_1$ and $T_2$, respectively) of each of the first and second material layers 328 and 330. The erosion shield 326 may also be formed with a near-net shape of the second material layer 330 that includes the erosion-resistant material, to facilitate reducing or eliminating the need for subsequent machining processes that remove erosion-resistant material.

As shown in FIG. 4A, initially at step 400A, a layer of filler material 402 is deposited using a directed energy deposition (DED) system 404. The layer of filler material 402 is used to produce the first material layer 328 of the erosion shield 326. In the exemplary embodiment, the DED system 404, shown schematically in FIG. 4A, is a wire-fed DED system 404, such as, for example, an electric arc wire-fed DED system, an electron beam wire-fed DED system, or a laser wire-fed DED system. The DED system 404 includes a build platform or surface 406, a material source 408, and an energy source 412 that emits an energy beam 414 (e.g., an electric arc, electron beam, or laser) and directs the energy beam 414 towards the build platform 406. For wire-fed DED systems 404, the material source 408 is a wire material source 408 that feeds a metal wire 410 (e.g., a wire of suitable filler material). The wire material source 408 and the energy source 412 cooperate to deposit the layer of filler material 402. In particular, the wire material source 408 feeds the metal wire 410 which is exposed to the energy beam 414 emitted by the energy source 412 at suitable locations adjacent to the build platform 406 such that the metal wire 410 is melted, thereby depositing thin films of filler material. The process is repeatedly continued at step 400A such that thin films of the filler material are successively deposited to build the deposited layer of filler material 402. The DED system 404 may include a motion device (not shown) coupled to the wire material source 408 and the energy source 412 and in communication with a controller (not shown). The motion device may be a gantry system, computer numerical control (CNC) machine, Cartesian robot, or other suitable system that facilitates multi-axis movement of the wire material source 408 and the energy source 412. The controller may be used to control multi-axis movement of the motion device to guide a tool path of the wire material source 408 and the energy source 412 to produce a desired shape of the deposited layer (e.g., the deposited layer of filler material 402). Suitably, the DED process in step 400A is controlled so that the deposited layer of filler material 402 has an upper surface 416 that creates a desired shape of the interface 340 between the first material layer 328 and the second material layer 330 in the erosion shield 326. For example, as shown in FIG. 4A, the upper surface 416 may extend from an upper ledge 436 in a ramp or staircase shape such that a thickness $T_3$ of the layer of filler material 402 tapers as the layer 402 extends from the ledge 436 at a first end 418 to a second end 420.

As shown in FIG. 4B, the process continues at step 400B wherein a layer of erosion-resistant material 422 is deposited across the upper surface 416 of the layer of filler material 402. The layer of erosion-resistant material 402 is used to produce the second material layer 330 of the erosion shield 326. In the exemplary process, the layer of erosion-resistant material 422 is deposited using the same wire-fed DED system 404 used to deposit the layer of filler material 402. Alternatively, the layer of erosion-resistant material 422 may be deposited using a different wire-fed DED system 404. To deposit the layer 422, the wire material source 408 feeds a metal wire 424 (e.g., a wire of suitable erosion-resistant material) which is exposed to the energy beam 414 emitted by the energy source 412 at suitable locations adjacent the upper surface 416 of the layer of filler material 402 to cause the metal wire 424 to melt, thereby depositing thin films of erosion-resistant material across the upper surface 416. The process is repeated to cause thin films of the erosion-resistant material to be successively deposited such that the deposited layer of erosion-resistant material 422 is built. As described above, the wire material source 408 and the energy source 412 may be coupled to the motion device in communication with the controller. The controller may be used to control multi-axis movement of the motion device to guide a tool path of the wire material source 408 and the energy source 412 to produce a desired shape of the deposited layer of erosion-resistant material 422. In some embodiments, the DED process in step 400B is controlled so that the deposited layer of erosion-resistant material 422 has a near-net shape such that little to no machining of the layer of erosion-resistant material 422 is required to produce the second material layer 330 in the erosion shield 326 following step 400B. The layer of erosion-resistant material 422 is deposited across the layer of filler material 402 such that the interface 340 is formed with a shape corresponding to the shape of the upper surface 416 produced in step 400A.

The interface 340 formed between the layer of erosion-resistant material 422 and the adjacent layer of filler material 402 may include a composition gradient across the interface 340. The interface 340 may extend a thickness between the adjacent layers of erosion-resistant material 422 and filler material 402 and includes both filler material and erosion-material material. To form the composition gradient of the interface 340, the amount of the erosion-resistant material in the interface 340 gradually increases while the amount of the filler material in the interface 340 gradually decreases as the interface 340 extends from the layer of filler material 402 to the layer of erosion-resistant material 422. The composition gradient across the interface 340 may be incidentally formed during deposition of the filler material layer 402 and erosion-resistant material layer 422. For example, when the erosion-resistant material layer 422 is deposited across the upper surface 416 of the filler material layer 402, the filler material at or proximate the upper surface 416 may melt and intimately mix with the erosion-resistant material being deposited using the DED system 404. As more films of the erosion-resistant material are deposited to build the layer of erosion-resistant material 422, less filler material is exposed to the deposition conditions and is mixed with the erosion-resistant material, thereby creating the incidental composition gradient of the interface 340. Additionally or alternatively, the composition gradient across the interface 340 may be deliberately formed. For example, in an intermediate step between depositing the layer of filler material 402 (FIG. 4A) and the layer of erosion-resistant material 422 (FIG. 4B), the interface 340 may be deposited as a hybrid layer using a mixed feed of filler material and erosion-resistant material. As the interface 340 is built, less filler material and more erosion-resistant material may be fed to produce successively deposited films of the interface 340. For example, the interface 340 may be deposited (or built) by first depositing films that include a greater amount of filler material than erosion-resistant material adjacent to the layer of filler material 402, then depositing films that include a substantially equal amount of filler material and erosion-resistant material, and finally depositing films of a greater amount of erosion-resistant material than filler material until the films include only erosion-resistant material to begin the layer of erosion-resistant material 422. The discrete composition of each film deposited to build the interface 340 may be controlled to form a desired concentration gradient, which may depend on a desired thickness of the interface 340.

In addition to the wire-fed DED systems described above, the DED system 404 used to deposit the layer of filler material 402, the layer of erosion-resistant material 422 and/or the interface 340 (if deposited as a separate hybrid layer) may be a powder-fed DED system 404, for example, laser or electron beam powder-fed DED system. In these embodiments, the powder-fed DED system 404 includes one or more powder material sources 408 that feed a suitable material powder (not shown) (e.g., a powder of suitable filler material or erosion-resistant material). The layers of filler material 402 and erosion-resistant material 422 are deposited by exposing the powder of suitable material fed by the powder material source 408 to an energy beam 414 emitted by the energy source 412 at suitable locations to deposit thin films of filler material or erosion-resistant material, or both. The process is repeated to cause thin films of the suitable material to be successively deposited such that the deposited layer of filler material 402, erosion-resistant material 422, or interface 340 is built. As described above, the powder material source 408 and the energy source 412 may be coupled to the motion device in communication with the controller. The controller may be used to control multi-axis movement of the motion device to guide a tool path of the wire material source 408 and the energy source 412 to produce a desired shape of the deposited layer.

As shown in FIGS. 4A and 4B, in the exemplary embodiment, the DED system 404 is oriented such that the build platform 406 lies in an XZ-plane defined by an X-axis and a Z-axis (extending out from and into the page). In this embodiment, the layer of filler material 402, the interface 340, and the layer of erosion-resistant material 422 are built on top of one another in stacked succession in a direction of the Y-axis. Other orientations of the DED system 404 are possible. For example, in some embodiments, the build platform 406 may lie in an XY-plane defined by the X-axis and the Y-axis, and the layer of filler material 402, the interface 340, and the layer of erosion-resistant material 422 are built side-by-side, rather than in stacked succession, in a direction of the Z-axis. Alternatively stated, the layer of filler material 402, the interface 340, and the layer of erosion-resistant material 422 are built in a direction of the Z-axis and have the same orientation shown in FIGS. 4A and 4B when built. Accordingly, description herein of the layer of erosion-resistant material 422 being "deposited across" the layer of filler material 402 is not limiting with respect to any specific orientation of the DED system 404 used to build the layer of filler material 402, the interface 340, and the layer of erosion-resistant material 422.

In the exemplary embodiment, deposition of the layer of filler material 402 (shown in FIG. 4A) may occur prior to deposition of the layer of erosion-resistant material 422 and forming the interface 340 (shown in FIG. 4B), such that the upper surface 416 and the upper ledge 436 are completely formed prior to depositing erosion-resistant material. In some embodiments, an optional surface finishing process may be performed on the upper surface 416 prior to depositing the layer of erosion-resistant material 422, or the layer of erosion-resistant material 422 may be deposited directly on the upper surface 416 without an intervening process step. In some other embodiments, the deposition process utilized to build the layer of filler material 402, the interface 340, and the layer of erosion-resistant material 422 is performed such that the structures shown in FIG. 4A and FIG. 4B are built in a single process step, rather than sequentially. In some embodiments, the DED system 404 may be utilized to perform a simultaneous multi-material deposition schema, in which portions of the layer of filler material 402 and portions of the layer of erosion-resistant material 422 or the interface 340 are built in a single step. Alternatively stated, the process sequence shown in FIGS. 4A and 4B may be performed in a single building process, where thin films are used to deposit both filler material in the layer 402 and erosion-resistant material for the interface 340 and/or the layer 422. To perform this process, the DED system 404 may be equipped with a dual material source 408 and/or dual energy source 412 configuration, such that the DED system 404 may deposit filler material and/or erosion-resistant material along a single deposited film. Accordingly, description herein of the layer of erosion-resistant material 422 being "deposited across" the layer of filler material 402 is not limiting with respect to any specific sequence of building the layer of filler material 402, the interface 340, and the layer of erosion-resistant material 422.

As shown in FIG. 4C, the process continues at step 400C wherein the layer of filler material 402, the layer of erosion-resistant material 422, or both are machined to remove the erosion shield 326 from the build surface 406. In the exemplary embodiment, the erosion shield 326 is removed from the build surface 406 by machining the layer of filler material 402, and the machining produces the first material layer 328 of the erosion shield 326 with a suitable size and shape. In this embodiment, the layer of filler material 402 is machined using a machining apparatus 428 that removes a portion of the layer of filler material 402 along cut line 426 (shown in FIG. 4B) to produce the first material layer 328 thereby defining a suitably-sized and shaped inner surface 336. Suitably, a shape of the cut line 426 substantially matches or complements a shape of the upper surface 416 produced in step 400A such that the first material layer 328 formed by machining the layer of filler material 402 has a substantially constant thickness $T_1$ along the length $L_3$ of the erosion shield 326 between the base end 332 and the nose 334, and such that the interface 340 and the inner surface 336 each extends the length $L_3$ of the erosion shield 326. In some embodiments, the machining apparatus 428 may be the DED system 404 (shown in FIGS. 4A and 4B), wherein the energy source 412 emits the energy beam 414 that preforms a subtractive process on the layer of filler material 402 (e.g., laser ablation, micromachining). Alternatively, as shown schematically in FIG. 4C, the machining apparatus 428 may be an electrical discharge machine (EDM) 428 used to remove the portion of the layer of filler material 402 along the cut line 426 using electrical discharge or sparks. The EDM 428 includes a driver 430 coupled to an electrode holder 432. The electrode holder 432 is coupled to and holds an electrode 434. The electrode 434 is driven toward a substrate (e.g., the deposited layer of filler material 402) and heats and discharges material from the substrate to produce a desired shape (e.g., a desired shape of the first material layer 328). In some embodiments, the machining apparatus 428 may also be used to machine the layer of erosion-resistant material 422 to produce a final shape of the second material layer 330 of the erosion shield. The machining apparatus 428 may include or be coupled to the motion device in communication with the controller, described above. The controller may be used to control multi-axis movement of the motion device to guide a tool path of the machining apparatus 428 to produce a desired shape of the deposited layer of erosion-resistant material 422. In some embodiments, each of the layer of erosion-resistant material 422 and the layer of filler material 402 have a near-net shape for the erosion shield 326, and the machining is performed solely to remove the erosion shield 326 from the build surface 406. Alternatively stated, the layer of filler material 402 may deposited having the desired shape of the first material layer 328 and the layer of erosion-resistant material 422 may be deposited having the desired shape of the second material layer 330, and little to no machining of the first material layer 328 and the second material layer 330 so deposited is required to produce the erosion shield 326. In some embodiments, a machining apparatus 428 may not be used, and machining is performed manually (e.g., by hand grinding).

Figure 5:
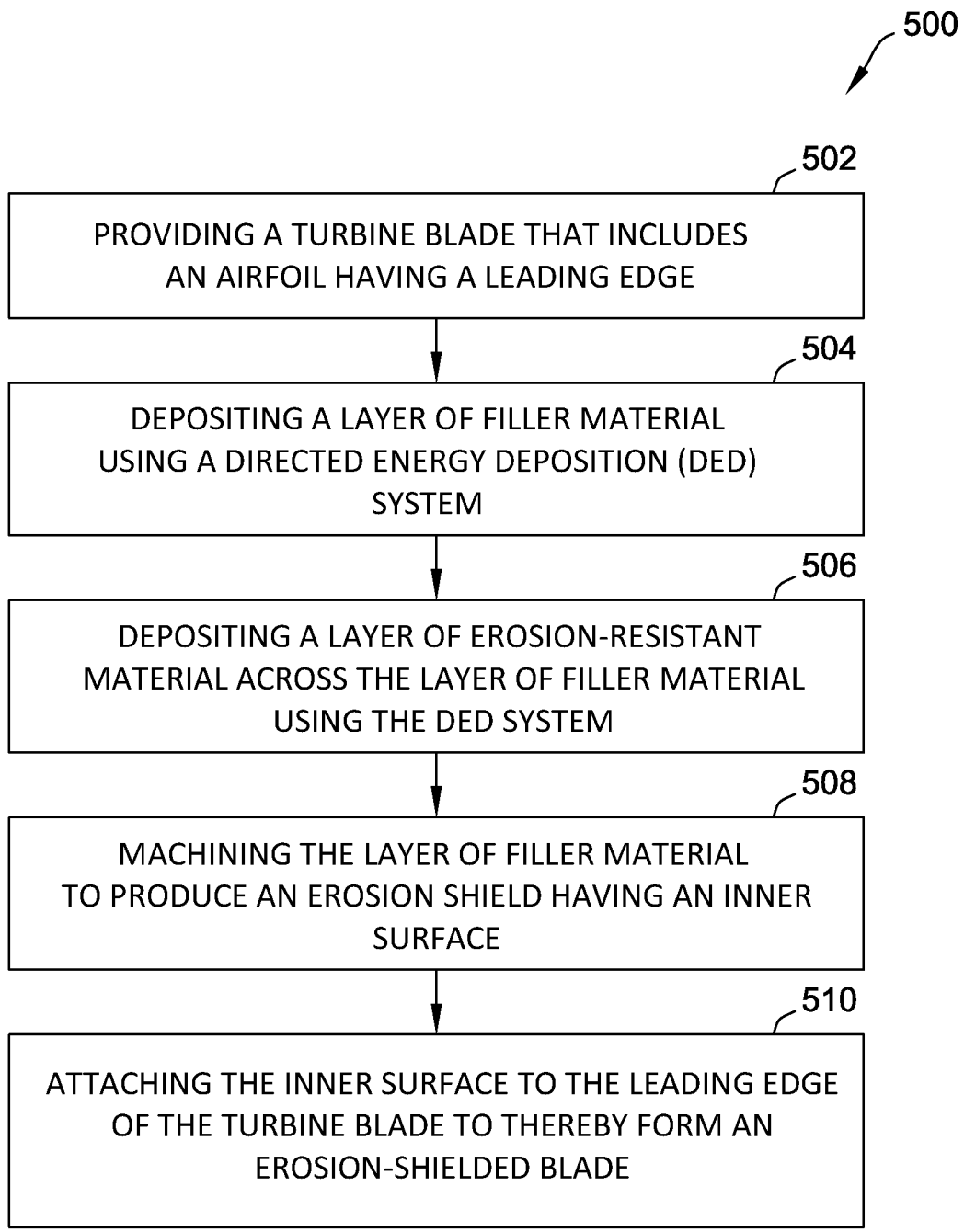
FIG. 5 is an exemplary process flow that may be implemented for forming the blade shown in FIG. 3.

FIG. 5 shows an exemplary method 500 of forming an erosion-shielded turbine blade (e.g., the blade 300 shown in FIG. 3). The method 500 includes providing 502 a turbine blade 300 for use with a rotary machine (e.g., rotary machine 110 shown in FIG. 1 and/or rotary machine 210 shown in FIG. 2). The turbine blade 300 includes an airfoil 302 that extends between a root 312 and a tip 316 of the turbine blade 300. The airfoil 302 (shown in FIG. 3) includes a pressure sidewall 308 (shown in FIG. 3) and a opposite suction sidewall 310 (shown in FIG. 3). The pressure and suction sidewalls 308 and 310 each extend between a leading edge 304 (shown in FIG. 3) and a trailing edge 306 (shown in FIG. 3) of the airfoil 302. In the exemplary embodiment, the pressure sidewall 308 has a concave shape and the suction sidewall 310 has a convex shape, relative to the radial axis R (shown in FIG. 3), such that the airfoil 302 has an arcuate contour that defines a geometry of the leading edge 304. Additionally, in the exemplary embodiment, a recessed area 318 (shown in FIG. 3) is formed in the leading edge 304 proximate the tip 316, such that the leading edge 304 includes a recessed surface 320 (shown in FIG. 3) that extends non-linearly along the radial axis R.

The method 500 also includes forming 504-508 an erosion shield 326 (shown in FIGS. 3 and 4C) that includes a filler material layer 328 and an erosion-resistant material layer 330 as a pre-form multi-material structure that is adapted to be attached or joined to the leading edge 304 of the airfoil 302 in a single fabrication step. The pre-formed erosion shield is formed by depositing 504 a layer of filler material 402 (shown in FIG. 4) that includes an upper surface 416 (shown in FIG. 4) having a suitable shape for an interface 340 (shown in FIGS. 3 and 4B-4C) defined between the filler material layer 328 and the erosion-resistant material layer 330 in the pre-formed erosion shield 326. A layer of erosion-resistant material 422 (shown in FIG. 4) is deposited 506 across the upper surface 416 of the layer of filler material 402, and the interface 340 is formed between the layers 402 and 422 with a shape that substantially corresponds to the shape of the upper surface 416. Suitably, the interface 340 is non-linear and substantially matches or complements a shape of the recessed surface 320 of the leading edge 304 of the airfoil 302. The non-linear interface 340 may be defined by a ramp or staircase shape of the upper surface 416. In this regard, depositing 504 the layer of filler material 402 is controlled such that the upper surface 416 matches or complements a geometry of the leading edge 304 to which the erosion shield 326 is to be attached (e.g., the upper surface 416 matches or complements a shape of the recessed surface 320). Each of the layers 402 and 422 are respectively deposited 504 and 506 using DED systems, for example, a wire-fed DED system 404 such as an electric arc wire-fed DED system, an electron beam wire-fed DED system, or a laser wire-fed DED system. The layer of filler material 402, the layer of erosion-resistant material 422, or both may then be machined 508 to remove the erosion shield 326 from a build surface 406 of the DED system 404. The first material layer 328 of the erosion shield 326 is produced from the layer of filler material 402 and the second material layer 330 is produced from the layer of erosion-resistant material 422.

In some embodiments, the layer of erosion-resistant material 422 is formed with a near-net shape such that little to no machining is required to produce the erosion-resistant material layer 330 of the erosion shield 326 from the layer 422. To produce the filler material layer 328 with a suitable size and shape for attaching to the leading edge 304 of the airfoil 302, the layer of filler material 402 may be machined 508 along a cut line 426 (shown in FIG. 4), which may have a shape that substantially matches or complements a shape of the interface 340. Machining 508 the layer of filler material 402 may include electrical discharge machining, for example. Suitably, machining 508 the layer of filler material 402 produces a filler material layer 328 having a substantially constant thickness $T_1$ along the length $L_3$ of the erosion shield 326. Additionally, the interface 340 extends the length $L_3$ of the erosion shield 326 between the base end 332 and the nose 334, such that the first material layer 328 is extends substantially entirely between the airfoil 302 and the second material layer 328 when attached to the leading edge 304. After machining 508, the filler material layer 328 of the pre-form erosion shield 326 defines an inner surface 336 that substantially matches or complements a geometry of a portion of the leading edge 304 (e.g., the recessed surface 320) to which the layer 328 is attached.

The method 500 also includes attaching 510 the inner surface 336 of the filler material layer 328 to the leading edge 304 to thereby secure the erosion shield 326 to the airfoil 302. In some embodiments, attaching 510 the inner surface 336 of the filler material layer 328 to the leading edge 304 includes welding the inner surface 336 to the leading edge 304, for example, by laser welding, gas metal arc welding, electron beam welding, or gas tungsten arc welding. In the exemplary embodiment, the inner surface 336 of the filler material layer 328 is attached 510 to the recessed surface 320 of the leading edge 304. As such, a shape of the inner surface 336, and suitably a shape of the interface 340, substantially matches or complements a shape of the recessed surface 320. The erosion-resistant material layer 330 defines an outer surface 338 of the erosion shield 326, and the outer surface 338 forms an externally-oriented surface of the airfoil 302 when the erosion shield 326 is secured thereto. The filler material layer 328 suitably facilitates attaching 510 the inner surface 336 to the leading edge 304 in a single fabrication step, and facilitates attaching 510 the inner surface 336 to the leading edge 304 without the use of additional filler material.

The above-described embodiments of erosion-shielded rotary components, and methods of forming such erosion-shielded rotary components, overcome at least some disadvantages of known rotary components. Specifically, in the exemplary embodiment, a pre-form erosion shield is joined to a rotary component, i.e., a blade, in a single fabrication step that facilitates a fast and simple joining of the pre-form erosion shields to rotary components, and facilitates eliminating complexities associated with conventional multi-step joining processes. Accordingly, manufacturing and repair times, downtime costs, and other operational inefficiencies associated with forming erosion-shielded rotary components can be substantially reduced. Additionally, the additive manufacturing and machining processes utilize DED systems that facilitate producing a near-net shape of the layer of erosion-resistant material, and thereby facilitate reducing material waste, overall material costs, and material sourcing challenges. Furthermore, an interface between layers of additive material in the erosion shield can be controlled so that filler layers are substantially entirely interposed between the rotary component and external, erosion-resistant layers of the erosion shield. Thus, using DED systems, the geometry of the pre-formed erosion shield (e.g., the interface, the layer of erosion-resistant material, and the inner surface of the layer of filler material) can be tailored to a leading edge geometry of a rotary component.

Exemplary embodiments of an erosion-shielded rotary component, methods of forming an erosion shield for attaching to a rotary component, and methods of forming an erosion-shielded rotary component, are described above in detail. The erosion-shielded rotary components and erosion shields are not limited to the specific embodiments described herein, but rather, components of systems may be utilized independently and separately from other components described herein. For example, the erosion shields formed as disclosed herein may be used in combination with rotary components other than those specifically described herein, and the erosion-shielded rotary components may also be used in combination with other rotary machines and methods, and are not limited to practice with only the gas turbine engine or steam turbine engine assemblies as described herein. Rather, the exemplary embodiment can be implemented and utilized in connection with many other rotary machine applications.

Further aspects of the present disclosure are provided by the subject matter of the following clauses:

1. A method of forming an erosion shield for use with a turbine blade, the method comprising depositing a layer of filler material using a directed energy deposition (DED) system, the layer of filler material defining an upper surface; depositing a layer of erosion-resistant material across the upper surface of the layer of filler material using the DED system, an interface being defined between the layer of filler material and the layer of erosion-resistant material and having a shape of the upper surface; and machining the layer of filler material to produce the erosion shield extending a length between a base end and a nose, the erosion shield having the layer of erosion-resistant material, the machined layer of filler material, and the interface defined therebetween, an inner surface of the erosion shield being defined by the machined layer of filler material that is sized and shaped for attaching to a leading edge of the turbine blade, each of the interface and the inner surface extending the length of the erosion shield.

2. The method in accordance with the preceding clause, wherein depositing the layer of filler material and depositing the layer of erosion-resistant material each includes using at least one of an electric arc wire-fed DED system, an electron beam wire-fed DED system, and a laser wire-fed DED system.

3. The method in accordance with any preceding clause, wherein depositing the layer of filler material includes depositing a layer of a nickel-based material.

4. The method in accordance with any preceding clause, wherein depositing the layer of filler material includes depositing a layer of a nickel-chromium alloy material.

5. The method in accordance with any preceding clause, wherein depositing the layer of erosion-resistant material includes depositing a layer of at least one of a cobalt-based alloy, a chromium-based alloy, and a tungsten-based alloy.

6. The method in accordance with any preceding clause, wherein depositing the layer of erosion-resistant material includes depositing a layer of a cobalt-chromium alloy.

7. The method in accordance with any preceding clause, wherein machining the layer of filler material includes using electrical discharge machining to produce the erosion shield having the layer of erosion-resistant material, the machined layer of filler material, and the interface defined therebetween.

8. The method in accordance with any preceding clause, wherein depositing the layer of filler material includes depositing the layer of filler material such that the upper surface has a shape that complements a shape of the leading edge of the turbine blade.

9. The method in accordance with any preceding clause, wherein machining the layer of filler material produces the erosion shield having the machined layer of filler material with a constant thickness along the length of the erosion shield.

10. The method in accordance with any preceding clause, wherein depositing the layer of erosion-resistant material produces a near-net shape of the layer of erosion-resistant material for the erosion shield.

11. A method of forming an erosion-shielded turbine blade, the method comprising providing a turbine blade for use with a rotary machine, the turbine blade comprising an airfoil extending between a root and a tip of the turbine blade, the airfoil comprising a pressure side and an opposite suction side, each of the pressure and suction sides extending between a leading edge and a trailing edge; forming an erosion shield by depositing a layer of filler material using a directed energy deposition (DED) system, the layer of filler material defining an upper surface; depositing a layer of erosion-resistant material across the upper surface of the layer of filler material using the DED system, an interface being defined between the layer of filler material and the layer of erosion-resistant material and having a shape of the upper surface; and machining the layer of filler material having the layer of erosion-resistant material deposited thereon to produce the erosion shield extending a length between a base end and a nose, the erosion shield having the layer of erosion-resistant material, the machined layer of filler material, and the interface defined therebetween, an inner surface of the erosion shield being defined by the machined layer of filler material that is sized and shaped for attaching to the leading edge of the turbine blade, each of the interface and the inner surface extending the length of the erosion shield; and attaching the inner surface of the erosion shield to the leading edge of the turbine blade to thereby form the erosion-shielded turbine blade.

12. The method in accordance with any preceding clause, wherein attaching the inner surface of the erosion shield to the leading edge of the turbine blade includes welding the inner surface of the erosion shield to the leading edge of the turbine blade.

13. The method in accordance with any preceding clause, wherein welding the inner surface of the erosion shield to the leading edge of the turbine blade includes at least one of laser welding, gas metal arc welding, electron beam welding, and gas tungsten arc welding.

14. The method in accordance with any preceding clause, wherein welding the inner surface of the erosion shield to the leading edge of the turbine blade is performed without using additional filler material.

15. The method in accordance with any preceding clause, wherein welding the inner surface of the erosion shield to the leading edge of the turbine blade is performed in a single fabrication step.

16. The method in accordance with any preceding clause, wherein a recessed area is formed in the leading edge of the turbine blade proximate the tip, the leading edge having a recessed surface at the recessed area, and attaching the inner surface of the erosion shield to the leading edge of the turbine blade includes attaching the inner surface to the recessed surface such that the erosion shield extends across the recessed area.

17. The method in accordance with any preceding clause, wherein depositing the layer of filler material includes depositing the layer of filler material such that the shape of the upper surface complements a shape of the recessed surface.

18. The method in accordance with any preceding clause, wherein machining the layer of filler material includes machining the layer of filler material such that the inner surface defined by the machined layer of filler material is sized and shaped for attaching to the recessed surface and the machined layer of filler material has a constant thickness along the length of the erosion shield.

19. The method in accordance with any preceding clause, wherein the erosion shield extends across a portion of the leading edge when the erosion shield is attached to the leading edge, and depositing the layer of filler material includes depositing the layer of filler material such that the upper surface has a shape that complements a shape of the portion of the leading edge across which the erosion shield extends when attached to the leading edge.

20. The method in accordance with any preceding clause, wherein depositing the layer of erosion-resistant material produces a near-net shape of the layer of erosion-resistant material for the erosion shield.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming an erosion shield for use with a turbine blade, the method comprising:
    depositing a layer of filler material using a directed energy deposition (DED) system on a build platform of the DED system, the layer of filler material defining an upper surface;
    depositing a layer of erosion-resistant material across the upper surface of the layer of filler material using the DED system, an interface being defined between the layer of filler material and the layer of erosion-resistant material and having a shape of the upper surface; and
    machining the layer of filler material to remove the erosion shield from the build platform, the erosion shield extending a length between a base end and a nose, the erosion shield having the layer of erosion-resistant material, the machined layer of filler material, and the interface defined therebetween, an inner surface of the erosion shield being defined by the machined layer of filler material that is sized and shaped for attaching to a leading edge of the turbine blade, wherein the layer of filler material is machined along a cut line having a shape that complements the shape of the upper surface of the layer of filler material such that each of the interface and the inner surface extend the length of the erosion shield.

2. The method in accordance with claim 1, wherein depositing the layer of filler material and depositing the layer of erosion-resistant material each includes using at least one of an electric arc wire-fed DED system, an electron beam wire-fed DED system, and a laser wire-fed DED system.

3. The method in accordance with claim 1, wherein depositing the layer of filler material includes depositing a layer of a nickel-based material.

4. The method in accordance with claim 1, wherein depositing the layer of filler material includes depositing a layer of a nickel-chromium alloy material.

5. The method in accordance with claim 1, wherein depositing the layer of erosion-resistant material includes depositing a layer of at least one of a cobalt-based alloy, a chromium-based alloy, and a tungsten-based alloy.

6. The method in accordance with claim 1, wherein depositing the layer of erosion-resistant material includes depositing a layer of a cobalt-chromium alloy.

7. The method in accordance with claim 1, wherein machining the layer of filler material includes using electrical discharge machining to produce the erosion shield having the layer of erosion-resistant material, the machined layer of filler material, and the interface defined therebetween.

8. The method in accordance with claim 1, wherein depositing the layer of filler material includes depositing the layer of filler material such that the shape of the upper surface complements a shape of the leading edge of the turbine blade.

9. The method in accordance with claim 1, wherein machining the layer of filler material produces the erosion shield having the machined layer of filler material with a constant thickness along the length of the erosion shield.

10. The method in accordance with claim 1, wherein depositing the layer of erosion-resistant material produces a near-net shape of the layer of erosion-resistant material for the erosion shield.

11. A method of forming an erosion-shielded turbine blade, the method comprising:
    providing a turbine blade for use with a rotary machine, the turbine blade comprising an airfoil extending between a root and a tip of the turbine blade, the airfoil comprising a pressure side and an opposite suction side, each of the pressure and suction sides extending between a leading edge and a trailing edge;
    forming an erosion shield by:
        depositing a layer of filler material using a directed energy deposition (DED) system on a build platform of the DED system, the layer of filler material defining an upper surface;
        depositing a layer of erosion-resistant material across the upper surface of the layer of filler material using the DED system, an interface being defined between the layer of filler material and the layer of erosion-resistant material and having a shape of the upper surface; and
        machining the layer of filler material to remove the erosion shield from the build platform, the erosion shield extending a length between a base end and a nose, the erosion shield having the layer of erosion-resistant material, the machined layer of filler material, and the interface defined therebetween, an inner surface of the erosion shield being defined by the machined layer of filler material that is sized and shaped for attaching to a leading edge of the turbine blade, wherein the layer of filler material is machined along a cut line having a shape that complements the shape of the upper surface of the layer of filler material such that each of the interface and the inner surface extend the length of the erosion shield; and
    attaching the inner surface of the erosion shield to the leading edge of the turbine blade to thereby form the erosion-shielded turbine blade.

12. The method in accordance with claim 11, wherein attaching the inner surface of the erosion shield to the leading edge of the turbine blade includes welding the inner surface of the erosion shield to the leading edge of the turbine blade.

13. The method in accordance with claim 12, wherein welding the inner surface of the erosion shield to the leading edge of the turbine blade includes at least one of laser welding, gas metal arc welding, electron beam welding, and gas tungsten arc welding.

14. The method in accordance with claim 12, wherein welding the inner surface of the erosion shield to the leading edge of the turbine blade is performed without using additional filler material.

15. The method in accordance with claim 12, wherein welding the inner surface of the erosion shield to the leading edge of the turbine blade is performed in a single fabrication step.

16. The method in accordance with claim 11, wherein a recessed area is formed in the leading edge of the turbine blade proximate the tip, the leading edge having a recessed surface at the recessed area, and attaching the inner surface of the erosion shield to the leading edge of the turbine blade includes attaching the inner surface to the recessed surface such that the erosion shield extends across the recessed area.

17. The method in accordance with claim 16, wherein depositing the layer of filler material includes depositing the layer of filler material such that the shape of the upper surface complements a shape of the recessed surface.

18. The method in accordance with claim 17, wherein machining the layer of filler material includes machining the layer of filler material such that the inner surface defined by the machined layer of filler material is sized and shaped for attaching to the recessed surface and the machined layer of filler material has a constant thickness along the length of the erosion shield.

19. The method in accordance with claim 11, wherein the erosion shield extends across a portion of the leading edge when the erosion shield is attached to the leading edge, and depositing the layer of filler material includes depositing the layer of filler material such that the shape of the upper surface complements a shape of the portion of the leading edge across which the erosion shield extends when attached to the leading edge.

20. The method in accordance with claim 11, wherein depositing the layer of erosion-resistant material produces a near-net shape of the layer of erosion-resistant material for the erosion shield.

* * * * *